(No Model.) 4 Sheets—Sheet 1.

H. LAISSLE.
MACHINE FOR MOLDING PULLEYS.

No. 418,523. Patented Dec. 31, 1889.

Witnesses
Inventor
Hugo Laissle
By John J. Halsted his Attys.

(No Model.) 4 Sheets—Sheet 2.

H. LAISSLE.
MACHINE FOR MOLDING PULLEYS.

No. 418,523. Patented Dec. 31, 1889.

Fig. 2ª.

Witnesses
Will T. Norton
Harry S. Rohrer

Inventor
Hugo Laissle
By John J. Halsted & Son
his Attys (No Model.)　　　　　　　　　　　　　4 Sheets—Sheet 3.
H. LAISSLE.
MACHINE FOR MOLDING PULLEYS.

No. 418,523.　　　　　　　　　Patented Dec. 31, 1889.

Inventor
Hugo Laissle
By John J. Halsted & Son
his att'ys (No Model.) 4 Sheets—Sheet 4.

H. LAISSLE.
MACHINE FOR MOLDING PULLEYS.

No. 418,523. Patented Dec. 31, 1889.

UNITED STATES PATENT OFFICE.

HUGO LAISSLE, OF VIENNA, AUSTRIA-HUNGARY.

MACHINE FOR MOLDING PULLEYS.

SPECIFICATION forming part of Letters Patent No. 418,523, dated December 31, 1889.

Application filed June 27, 1889. Serial No. 315,714. (No model.) Patented in Austria-Hungary December 19, 1888, No. 35,158 and No. 54,223, and in France March 13, 1889, No. 196,677.

*To all whom it may concern:*

Be it known that I, HUGO LAISSLE, civil engineer, a citizen of Germany, and a resident of Vienna, in the Empire of Austria-Hungary, have invented certain new and useful Improvements in Machinery for Molding Pulleys, (for which I have obtained patents in Austria-Hungary, dated December 19, 1888, No. 35,158 and No. 54,223, and in France, dated March 13, 1889, No. 196,677,) of which the following is a specification.

My invention relates to improved machinery for molding pulleys of various diameters, whether of one piece or divided, and whether having one set or several sets of arms; and the object of my invention is to mold the two halves of such pulleys in a more expeditious and accurate manner than heretofore. For this purpose I provide the improved machinery for molding pulleys, first, with a set of rings placed concentrically one within the other of equal depth and of diameters corresponding to the diameters of pulleys to be molded, carried by brackets projecting radially from the circumference of the framing of machinery; secondly, with an arrangement for raising any one desired ring of the above-mentioned set of rings to the required height; thirdly, with an arrangement for radially adjusting the supports exactly under the requisite ring; fourthly, with a device for raising the mold off the pattern and thereby removing it.

I will now describe my invention more particularly, reference being made to the annexed drawings, in which—

Figure 1:
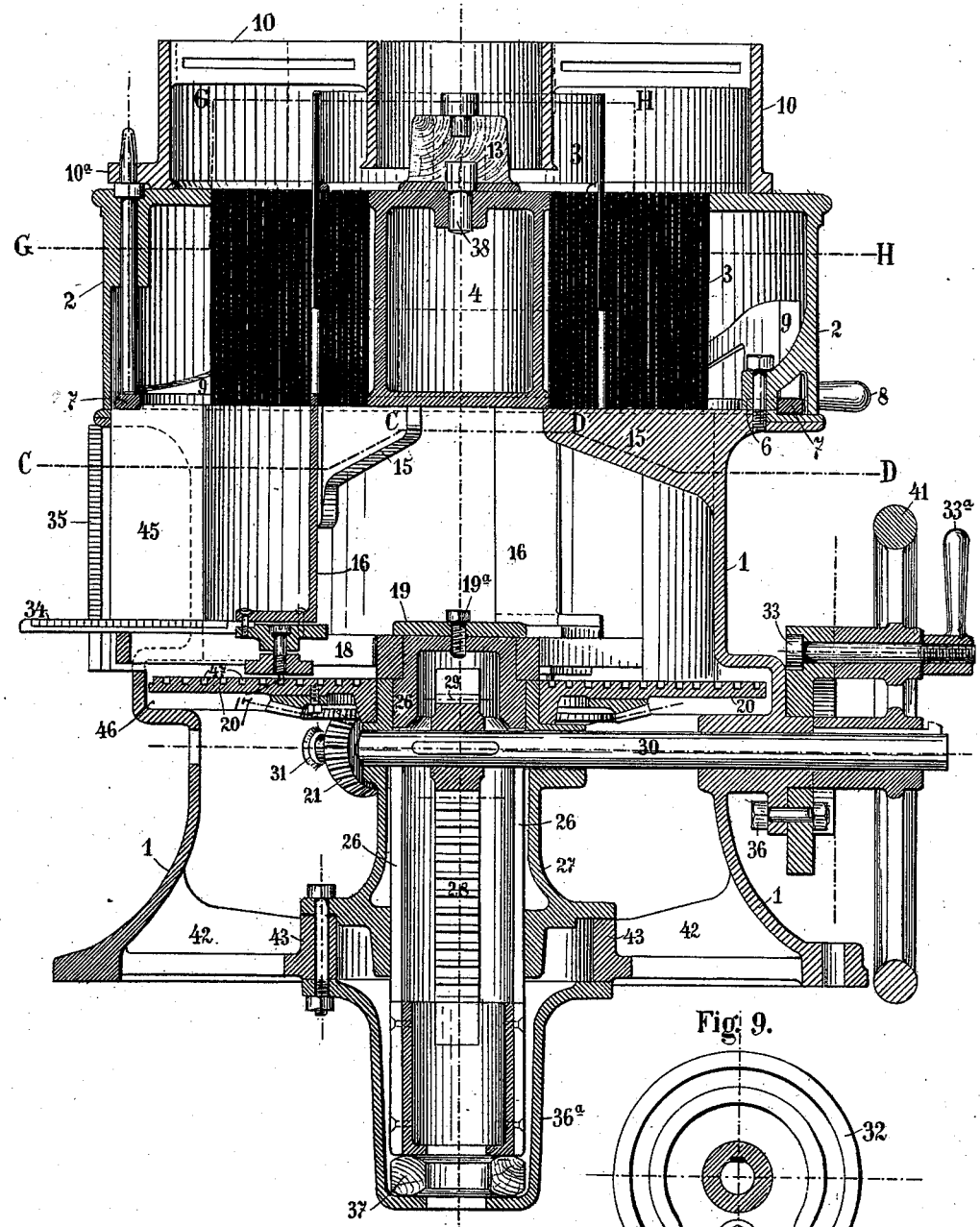
Figure 9:
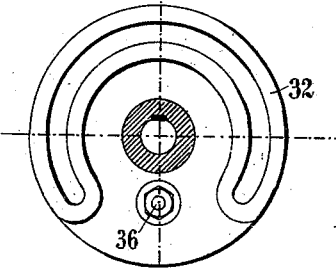
Figure 2:
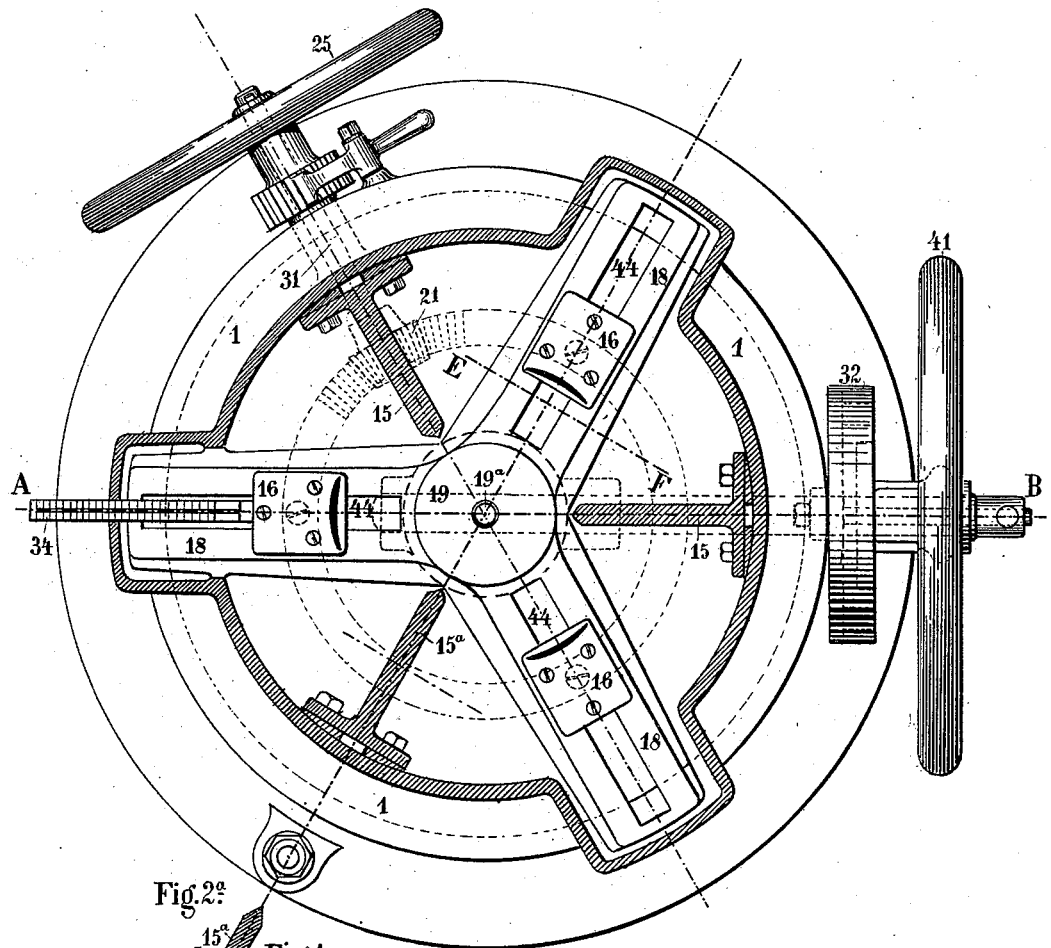
Figure 4:
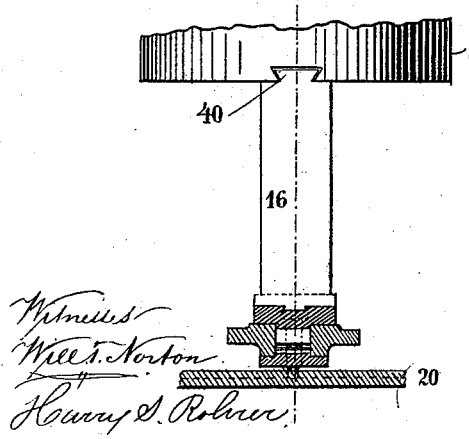
Figure 3:
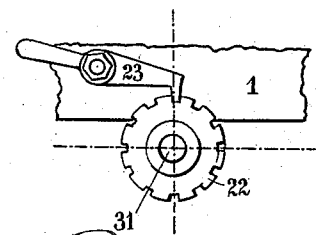
Figure 5:
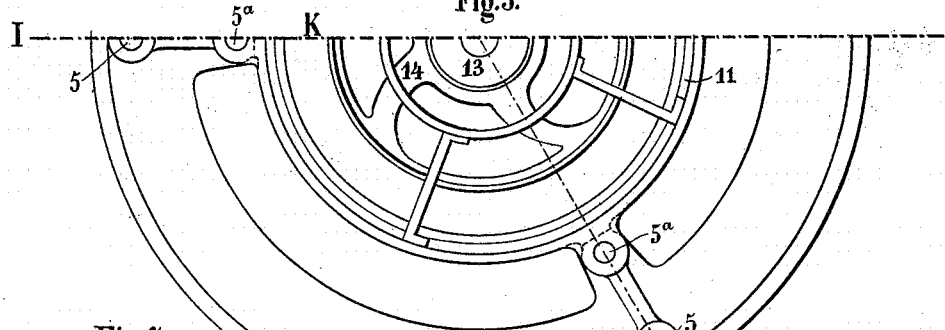
Figure 7:
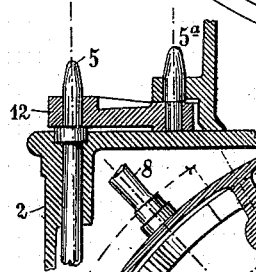
Figure 6:
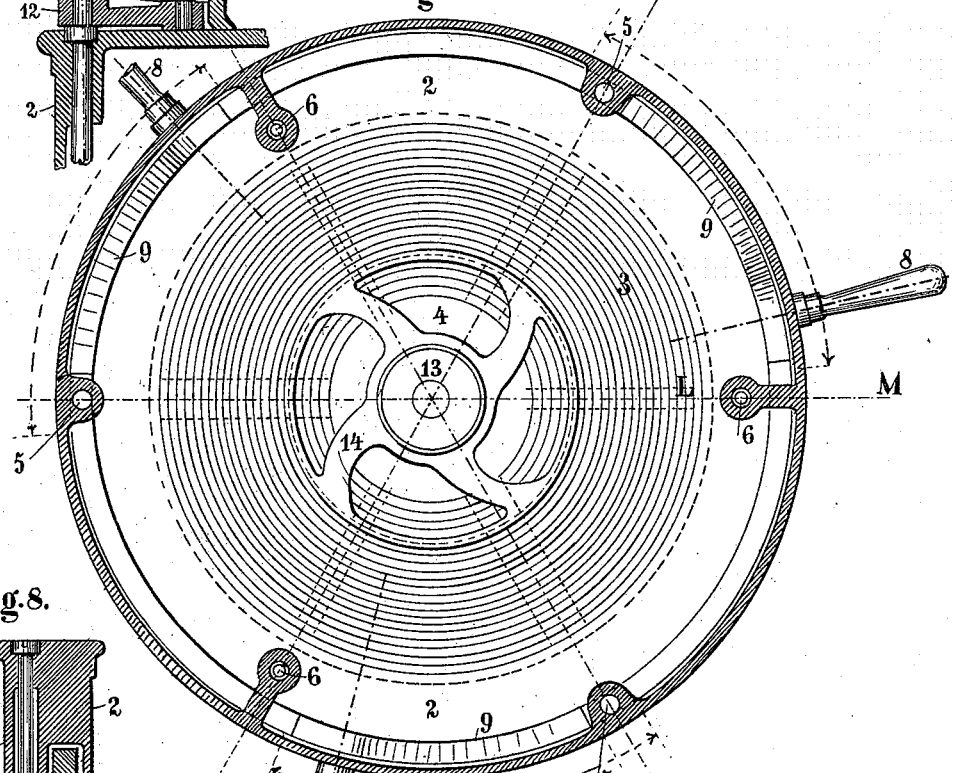
Figure 8:
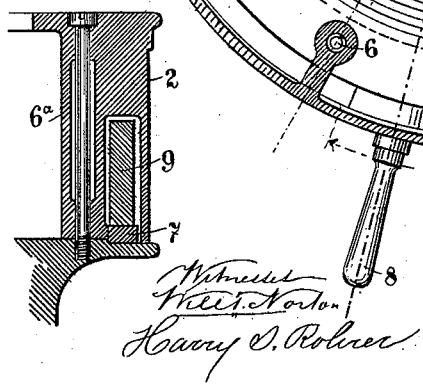
Figure 10:
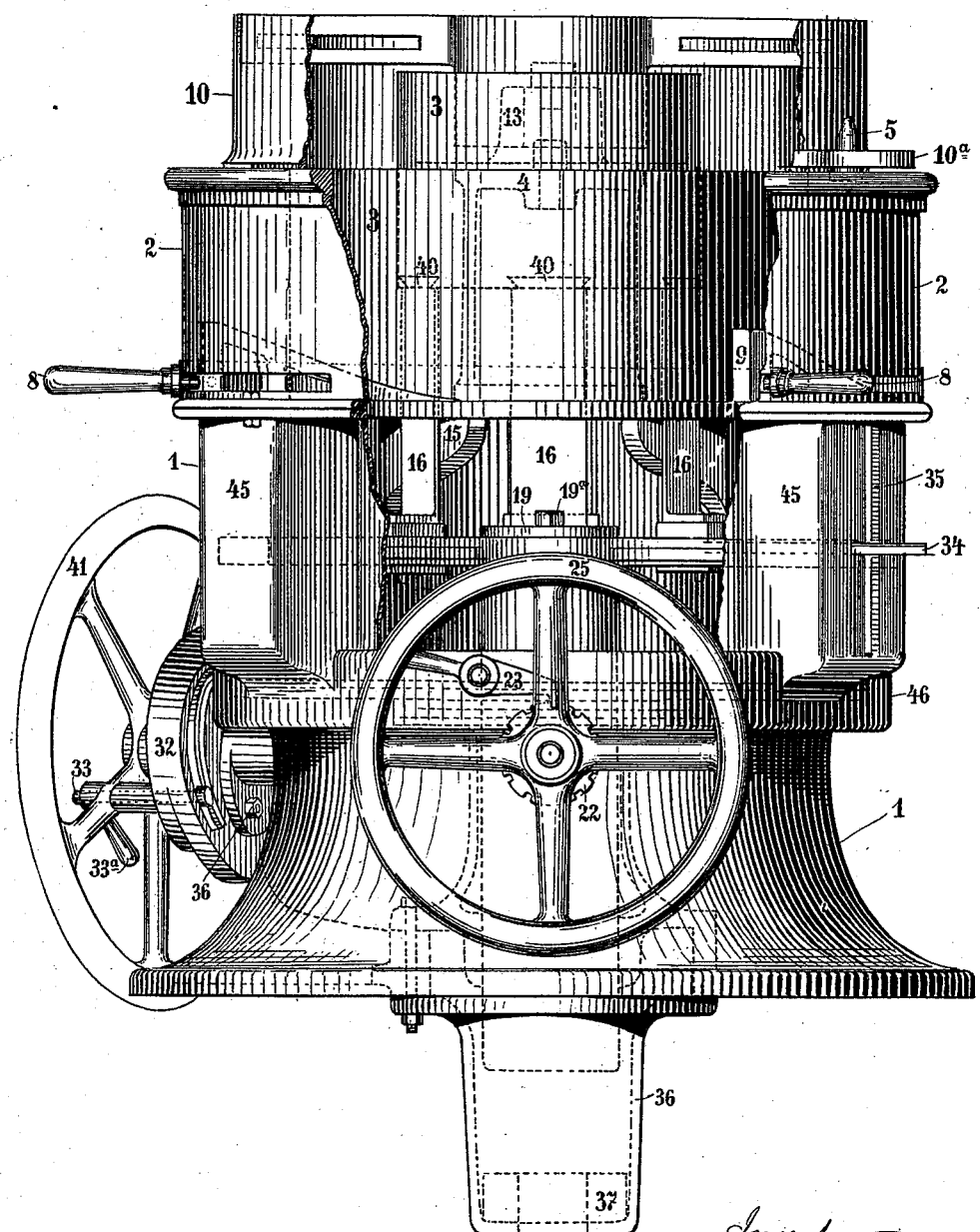

Figure 1, Sheet I, is a vertical section of the entire machine on the line A B of Fig. 2. Fig. 2, Sheet II, is a plan view of the same, partly in section on the line C C D D of Fig. 1. Fig. 2ª is a cross-section of one of the brackets. Figs. 3 and 4, Sheet II, show in a front view a detail of the adjusting device of the ring-supports, and in front elevation, partly in vertical section, on the line E F of Fig. 2, one of these supports placed on the radial arm-piece and the spiral grooved plate. Fig. 5, Sheet III, shows in plan view the molding-surface of one-half of the machine when a small mold-box is used. Fig. 6, Sheet III, is a plan view, partly in section, of the machine on the line G G H H of Fig. 1. Figs. 7 and 8, Sheet III, are respectively elevations, partly in vertical sections, on line I K of Fig. 5 and on line L M of Fig. 6, of the annular carrier with guide-pin of the mold-box and of the arrangement for removing this box. Fig. 9, Sheet I, is a front elevation, partly in vertical section, of the clamping device. Fig. 10, Sheet IV, is a view of the entire machine in the direction of arrow N of Fig. 2, the frontal part of framing and of the mold-box being cut away for giving view to the inner parts of the machine.

Similar letters refer to similar parts throughout all the figures.

The machine is constructed of a framing, consisting of the upper part 2 and the lower part 1, Figs. 1 and 10, bolted together by the aid of the shoulder 6, Fig. 1, and 6ª of Fig. 8, which shows a modified form of connecting the two parts of the casing. The lower part 1 is cast with hollows 45 and 46, ribs 42, and annular flange 43, to which is connected by bolts the vertical part 27 of the casing. In the upper part 2 are situated a number of metal rings 3, Figs. 1, 6, and 10, fitting concentrically closely one within the other, each of which rings represents the half-mold of the rim of a pulley of corresponding diameter. These rings are all of the same depth, so that their upper and lower ends form together a flat surface. They are capable of being slid separately upward into a half-mold box 10, which is placed temporarily on top of the framing 2, the extent to which they are thus raised being equal to one-half the width of the pulley-rim to be molded. The central space within the mold-ring of smallest diameter is filled out with a cylindrical piece 4, the upper surface of which, together with the surface formed by the upper ends of the rings 3 and an annular flange of the frame 2 beyond the outermost ring 3, constitutes the bottom plate of the half-mold box 10. The central piece 4, as also the concentric rings 3, is carried by brackets 15 and 15ª, Figs. 1, 2, and 10, projecting radially from the circumference of the lower part 1 of the casing, and intermediately between these brackets 15 and 15ª are vertical supports 16, Figs. 1, 2, and 10, formed of thin plates, the lower ends of which are carried as will be presently described, while the upper ends are formed with a dovetail head 40, fitting into corresponding dovetail notches in the lower edges of the rings 3, as may clearly be seen in Figs. 4 and 10. These notches constitute continuous dovetail radial grooves, in which the dovetail heads 40 of the supports 16 can slide radially until they are brought beneath the particular ring which is of the diameter required for the pulley to be molded, so that by then raising the supports 16 they push up the said ring from between the two contiguous ones, so as to make it project into the mold-box 10, as described, and shown in Figs. 1 and 10 of the drawings.

The arrangements for imparting the said radial and vertical motions to the supports 16 are as follows: The lower ends of the supports 16 are fixed to blocks that can slide in radial slots 44, formed in arms 18, projecting radially from a central ring carried by a vertical cylinder 26 and held back in its position by the plate 19 and bolt 19ª, Figs. 1, 2, and 10. The vertical cylinder 26 is capable of moving up and down in the central cylindrical part 27 of the framing 1. (See Fig. 1 of the drawings.) This cylindrical part 27 of the framing 1 carries on a flange near its upper end a rotary circular plate 20, Figs. 1 and 4, which is situated just below the under side of the sliding blocks of the supports 16, and it is provided on its upper face with a continuous spiral groove 47, into which take pins 17, projecting down from the said blocks, so that by rotating the plate 20 by means of toothed gearing 21 on the shaft 31 and hand-wheel 25, Figs. 1, 2, and 10, the said blocks, with the supports 16, can be moved radially to bring the latter under any particular ring, as described. To the one sliding block is fixed an outward-projecting arm having a scale 34 of inches or other measurement, Figs. 1, 2, and 10, marked thereon corresponding to the diameters of the different rings, so that on moving the supports 16 radially until the scale 34 indicates against a fixed index the exact diameter required the supports 16 will have been brought exactly under the corresponding ring. The spindle 31 of the toothed gear 21, that effects the rotation of the grooved plate 20, is provided with a ratchet-wheel 22, with which engages a spring-pawl 23, so as to hold the plate in the position into which it has been moved. (See Figs. 3 and 10.) The supports 16 having been first brought under the ring to be raised, the cylinder 26, carrying the radial arms 18, on which rest the supports 16, is now moved upward by the following arrangement: The cylinder 26 is provided with the toothed rack 28, with which gears the pinion 29 on the shaft 30, that is rotated by the hand-wheel 41, Figs. 1, 2, and 10.

For raising the ring to the exact height required for the half-mold, the vertical scale 35 is fixed on the casing 1, against which the before-mentioned arm carrying the horizontal scale 34 slides until it arrives at a division indicating the width of pulley required, Figs. 1 and 10. During this movement the arms 18 are guided and held in their proper position by shoulders in the one hollow 45, Fig. 2. The ring is then secured in this position by clamping the hand-wheel 41 by means of the screw 33 and hand-lever 33ª to the slotted quadrant 32, connected with the casing 1 by means of the screw 36, Figs. 1, 2, and 10. A pattern of the half-boss 13 and arms 14, Figs. 1, 5, and 6, of the pulley having been placed upon a center pin 38 on the cylindrical piece 4 within the pattern-ring in the mold-box 10, the molding is then effected either by ramming by hand or by a press. When using a large box 10, Figs. 1 and 10, the same is secured in its position by means of lugs 10ª and guide-pins 5, Figs. 1, 5, 6, 7, and 10; while in case a small mold-box 11 is used, Fig. 5, the annular carrier 12, with guide-pins 5ª, Figs. 5 and 7, maintains the mold-box 11 in position, the annular carrier 12 being fitted upon the guide-pins 5. After the molding is completed the pattern-ring 3 is lowered again by lowering the supports 16, which draw the ring down by their dovetail heads 40. For then raising the mold-box 10 off the pattern of the half-boss 13 and arms 14 the guide-pins 5 extend vertically down through the upper part 2 of the frame and rest with their lower ends on inclines 9, formed on a ring 7 in the framing 2, that can be turned by handles 8, passing through slots in the frame, as may be seen in Figs. 1, 6, 8, and 10. The mold-box 10 fits with lugs 10ª on the upper ends of the guide-pins 5, which have collars bearing against the lugs 10ª, so that on rotating the said ring 7, with inclines 9, the guide-pins 5 are pushed up, and are thus made to raise the mold-box off the pattern, whereupon the mold-box is removed and the production of the second half-mold is proceeded with in the same manner.

In order to insure that the rings shall not shift in a circular direction, so that their notches shall always form a continuous dovetail groove, as described, one of the brackets (15ª, shown in cross-section in Fig. 2ª) that carry them is formed with its supporting-edge of a ∧ shape or other suitable form, fitting into a correspondingly-formed notch in each of the rings 3, so that if the raised ring should have slightly shifted it will in descending be brought back to its correct position by the ∧-shaped edge entering the notch.

In order to prevent a sharp concussion when the raised parts descend upon their supports again, there is provided in the cylindrical part 36ª of the casing a spring-buffer 37, which is slightly compressed by the lower end of the raising-cylinder 26 as it arrives on its lowest position.

I claim—

1. In a machine for molding pulleys, a flask or mold-box the bottom of which is mainly composed of the top edges of a series of rings concentrically arranged one within the other and adapted to be severally raised into the box to form a portion of the matrix, as set forth.

2. In a machine for molding pulleys, the combination, with a flask and support, of a number of rings 3, of iron or other suitable material, fitting concentrically closely one within the other and having at their lower ends dovetail notches, and supports 16, having dovetailed heads fitting such notches, substantially as described.

3. In a machine for molding pulleys, the supports 16, for severally raising the rings and fixed to blocks having depending bolts, as described, in combination with slotted radial arms 18, a scale on the sliding blocks of one of the supports, a helically-grooved plate engaged by the bolts and its gear-shaft 31, and a hand-wheel serving to move radially said supports under the required ring, substantially as described.

4. In a machine for molding pulleys, the combination, with a series of concentric pattern-rings, of the supports for severally raising the rings, the slotted radial arms, a vertical scale on the casing, vertically-movable cylinder 26, connected to the radial arms, provided with a vertical rack, and shaft 30, having a gear engaging with said rack and having also a hand-wheel thereon, substantially as described, and for the purposes specified.

5. In a machine for molding pulleys, the combination, with the upper part 2 of the frames, provided with horizontal slots, of guide-pins 5, extending downward through such upper part, the ring 7, having incline 9, on which said pins rest, and handles 8, extending through the slots, serving to turn said ring, all substantially as and for the purposes specified.

6. In a machine for molding pulleys, a casing consisting of an upper and a lower part bolted together, and also having the central cylindrical portions 27 and 36$^a$ and provided with brackets 15 and 15$^a$, combined with the central cylindrical piece 4, supported by the bracket, and the set of concentric pattern-rings vertically adjustable about said cylindrical piece, substantially as described, and for the purposes specified.

7. As a means for securing the pattern-ring in its raised position, the combination, with the intermediate adjusting mechanism, of the hand-wheel 41 and its clamping-screw 33, the slotted quadrant 32, fixed to the lower casing by its screw 36, and the handle 33$^a$, for working the screw 33, all substantially as shown and described.

Signed at Vienna, in the Empire of Austria-Hungary, this 31st day of May, A. D. 1889.

HUGO LAISSLE.

Witnesses:
 ED. SCHMIDT,
 OTTO SCHIFFER.